United States Patent [19]

Foik

[11] 3,994,139
[45] Nov. 30, 1976

[54] APPARATUS FOR AND A METHOD OF LAYING A PIPE LINE

[75] Inventor: Adolf Foik, Munich, Germany

[73] Assignee: Gewerkschaft Eisenhutte Westfalia, Westphalia, Germany

[22] Filed: July 9, 1975

[21] Appl. No.: 594,453

[30] Foreign Application Priority Data
Aug. 1, 1974 Germany............................ 2437012

[52] U.S. Cl. .................................. 61/105; 61/41 A; 61/42; 61/72.7; 61/85; 37/80 R
[51] Int. Cl.² ....................... F16L 1/00; E21D 11/00
[58] Field of Search................. 61/41 A, 72.1, 72.2, 61/72.5, 72.7, 85, 42; 37/80

[56] References Cited
UNITED STATES PATENTS

| 1,600,701 | 9/1926 | Sommer | 61/72.1 |
| 2,830,548 | 4/1958 | McElvany | 61/72.1 |
| 2,908,140 | 10/1959 | Everson, Jr. | 61/41 A |
| 3,605,419 | 9/1971 | Wells | 61/41 A X |
| 3,638,438 | 2/1972 | Kinnucan, Jr. | 61/72.1 |

Primary Examiner—Jacob Shapiro
Attorney, Agent, or Firm—Thompson, Birch, Gauthier & Samuels

[57] ABSTRACT

Apparatus for and a method of laying a pipe line utilizing an advanceable shield composed of a set of parallel elongate planks supported for longitudinal movement by a frame. These planks have cutting edges and can be shifted individually or in groups by means of rams coupled between the frame and the planks. This shield serves to excavate an open-topped trench and behind the shield is a receptacle connected to move with the frame. This receptacle is a substantially closed vessel resembling a bath tub in cross-section with an open top permitting a pipe section to be lowered therein. A rear end wall of this receptacle has an opening therein which enables the pipe section to be joined up to the end of another pipe section previously installed at the end of the pipe line.

18 Claims, 2 Drawing Figures

APPARATUS FOR AND A METHOD OF LAYING A PIPE LINE

BACKGROUND TO THE INVENTION

The present invention relates to an apparatus for and a method of laying a pipe line composed of pipe sections arranged end-to-end in an open trench.

In the construction of tunnels, adits and the like it is known to use a shield composed of parallel elongate members or planks which are supported and advanced selectively by means of rams. These members may be formed with cutting edges to attack and penetrate a working face or the shield may perform solely a support function, the actual excavation work being effected by a rotating cutting head or the like. The walls of the tunnel rearwardly of the shield are then usually supported by lining sections.

In the construction of pipe lines installed underground it is also known to drive pipe sections into a working face at the end of an open pit or trench with the aid of a drive station. In this technique the trench or pit must first be excavated by a mechanical digger for example to accommodate the drive station and the pipe sections and usually the walls of the trench are supported by planks or boards. Where the pipes are of relatively large diameter and where the ground is water logged this process is particularly problematic. There is a need for improved apparatus and methods of laying a pipe line in an open trench, which may be subsequently filled, without driving the pipe sections into the end wall and a general object of this invention is to provide such an apparatus and method.

SUMMARY OF THE INVENTION

In one aspect the present invention provides an apparatus for use in laying a pipe line composed of pipe sections arranged end-to-end in an open trench; said apparatus comprising an advanceable shield for excavating the trench and for supporting the walls thereof and a receptacle located in the trench rearwardly of the shield relative to the working end face of the trench, the receptacle serving to receive individual pipe sections and having an opening enabling each pipe section received in the receptacle to be joined to a previously-installed pipe section and permitting the receptacle to be advanced towards the shield.

In another aspect the invention provides a method of laying a pipe line composed of pipe sections arranged end-to-end in an open trench; said method comprising utilizing an advanceable shield to excavate the trench and to support the walls of the trench, introducing individual pipe sections into a receptacle located in the trench rearwardly of the shield relative to a working end face of the trench and joining each of the pipe sections in end-to-end relationship with the previously-installed section through an opening in the receptacle which allows the receptacle to be shifted towards the shield.

An apparatus made in accordance with the invention may employ a shield of the type known in tunnel construction for excavating the trench and this trench then advances as the pipe laying progresses. The apparatus is especially useful in water logged ground since the receptacle can be made water tight and sealed in relation to the trench. It is advantageous to fill the part of the trench accommodating the rearward part of the pipe line to bury the pipe sections and re-constitute the ground level. In known manner the shield may be composed of a set of parallel elongate members provided with cutting edges and supported and guided by a frame. Rams would then be used to effect relative movement between the members and the frame. If the receptacle is connected to a part of the shield and preferably to the support frame, then the receptacle can be shifted up to follow the advance of the shield from time to time when the rams are operated. Thus, each pipe section can be lowered into the receptacle and connected up to the endmost section of the pipe line and thereafter the receptacle can be shifted up to follow the advance of the shield ready to receive the next pipe section. Usually a region at the end of the previously-installed section would project into the receptacle when the latter has been shifted so that the next section can be lowered into the receptacle and joined up to the other pipe section internally of the receptacle. To facilitate joining of the pipe sections piston and cylinder units may be provided which are disposed within and connected to the interior of the receptacle. These units can be used to drive or force the pipe section lowered into the receptacle against the end of the previously-installed section. The rams of the shield can be used to move the receptacle backwards or forwards so that if necessary some positional adjustment can be made, for example, after shifting.

According to a further preferred feature of the invention a set of supplementary elongate members are provided for supporting the walls of the trench over the region of the receptacle. These supplementary members can be pivotably connected to the main members of the shield which effect cutting and the receptacle can lie in contact with these supplementary members.

As the pipe line progresses it is preferable to fill the gap between the pipe sections and the inner surface of the trench with liquid, for example, to prevent subsidence as described in more detail hereinafter.

As regards details of the receptacle preference is given to a U-shaped structure with side walls adjoining a bottom portion. The side walls can taper away from one another in the upward direction and can project above the ground level to define an entry zone for receiving the pipe sections. The bottom portion can be curvilinear with an internal radius of curvature approximating to that of the external diameter of the pipe sections. This facilitates alignment of the pipe sections. A rear end wall can adjoin a further wall forming a neck with the opening partly surrounding the pipe section(s) being formed between this further wall and the bottom portion. A packing or seal is preferably provided on the inside of the opening for engaging on the exterior of the pipe section(s). A front end wall facing the shield may have a recess for accommodating the piston and cylinder units used to join the pipe sections together when the units are brought into a non-operative stowed position. Apart from the joining of the sections, these units may also be used to assist the rams in shifting the receptacle.

The invention may be understood more readily and various other features of the invention may become more apparent from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
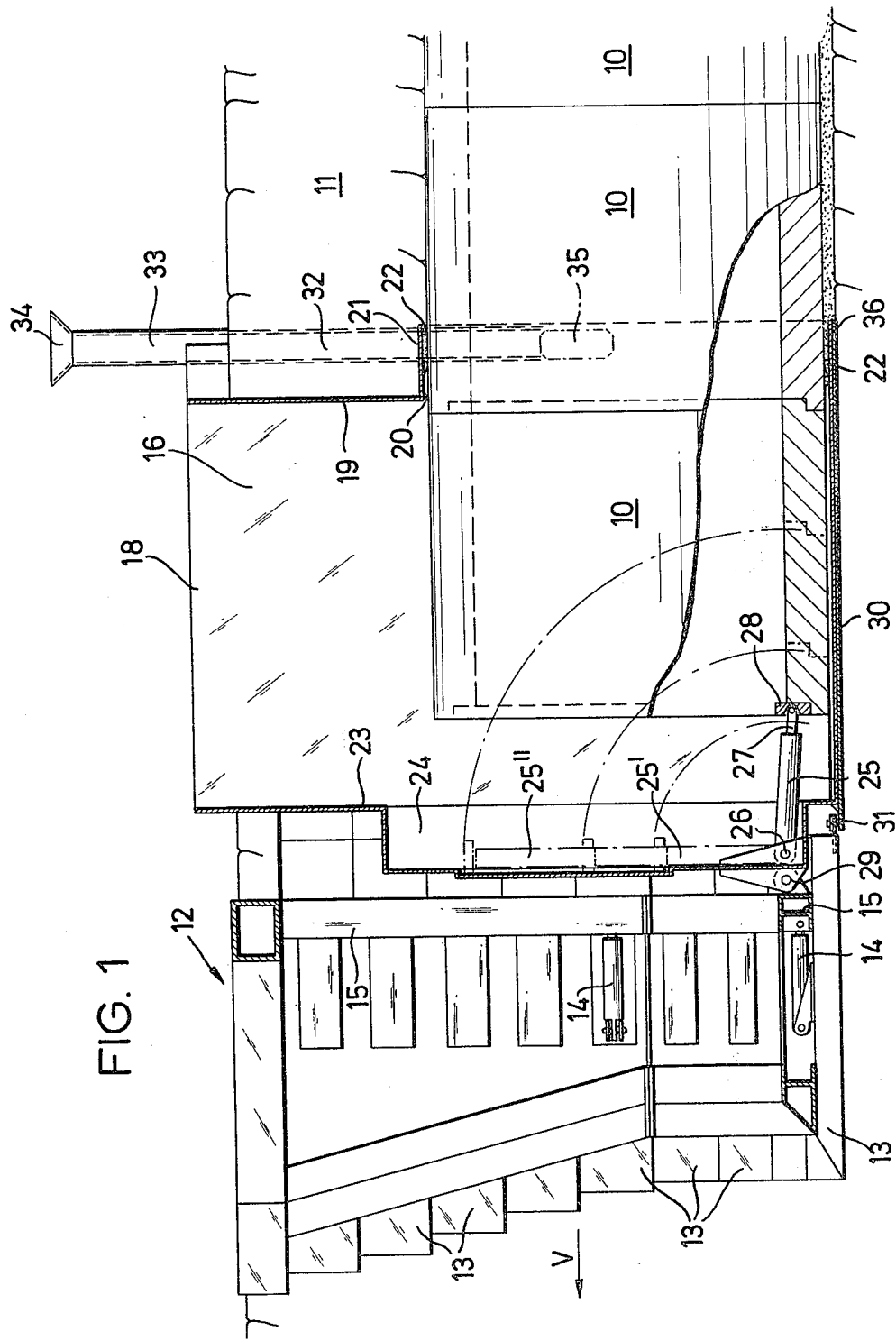
FIG. 1 is a schematic longitudinal sectional side view of apparatus made in accordance with the invention.

A composite pipe line for water mains, sewerage, or other purposes is composed of individual pipe sections or elements 10 arranged end-to-end and installed with the aid of the apparatus depicted in the drawings. The individual pipe sections 10, which can be pre-fabricated from concrete, are laid in an open trench and are provided with location means, such as the stepped tongue and groove connections on facing ends as shown in FIG. 1, to locate each section 10 against the previously installed section 10. As the pipe line advances the installed and joined sections 10 are covered by soil or a similar filling denoted 11 in FIG. 1, to reconstitute the ground surface so that the pipe sections 10 are buried beneath the ground surface. This means that only a sufficient length of open trench for working need be provided. To excavate the trench in advance of the actual pipe laying the apparatus uses a shield 12 which defines the shape of the trench and also serves to support the side walls of the trench. This shield 12 is composed of a set or a plurality of parallel elongate members or planks 13 generally arranged about the axis of the trench. In known manner, the forward ends of these members 13 have cutting edges and are urged forward individually or in groups in the direction of arrow V in FIG. 1 to penetrate a working end face of the trench. Each member 13 is supported for displacement in its longitudinal direction and to force or shift the members 13 there are provided double-acting hydraulic rams 14 which are pivotably secured at the rear to a main frame 15. This frame 15 serves to space and support the members 13 and to guide the members 13 during their displacement. The rams 14 are each connected via a linkage or bracket to a respective associated member 13 or group of members 13. It is possible to provide a ram 14 for each member 13 or alternatively each ram 14, or some of the rams 14, may each serve to displace a group of several members 13. In this latter case some appropriate connecting means can be provided to connect the members 13 of the group together.

In addition to the members 13 which perform both a supporting and cutting function the apparatus also utilizes a further set of supplementary elongate members 30 disposed rearwardly of the member 13 and the frame 15. These members 30 are relatively thin in comparison with the members 13 and preferably each have a substantially flat planar or slightly curved profile and serve primarily as a rear support for the trench walls. The members 30 are connected for movement with the members 13 with the aid of couplings 31 permitting relative pivoting between the members 13, 30. As shown best in FIG. 2, the members 30 extend over the sides and bottom of the trench and preferably guide means such as tongue and groove connections are provided between the mutually facing longitudinal edges of the members 30 so that, with the exception of the uppermost members 30, each member 30 is guided by the two adjacent members 30 at either side.

During the excavating operation, a single member 13 or a group of members 13 is advanced to penetrate the working end face of the trench by supplying pressure fluid to the ram 14 associated therewith so that the latter extends. The other rams 14 are preferably blocked in known manner so that the remainder of the members 13, 30 remain stationary. The member(s) 30 connected to the members (13) being shifted also advances. The members 13, 30 which are stationary are in firm frictional contact with the side walls and bottom of the trench and thus serve to anchor the frame 15. The frame 15 and these stationary members 13, 30 thereby effectively act as an abutment for the ram 14 which is operated. This procedure would be repeated for the other members 13 and when all the rams 14 have been extended they can all be operated simultaneously in a reverse sense to retract and draw up the frame 15 ready for the next operative cycle. During this latter phase when the frame 15 is drawn up, all the members 13, 30 collectively act as an effective abutment for the rams 14. The debris material excavated by the penetration of the members 13 into the working face can be lifted or removed by any suitable appliance located above the trench or in the shield 12 and this material can then be conveniently used as the in-filling material 11.

Figure 2:
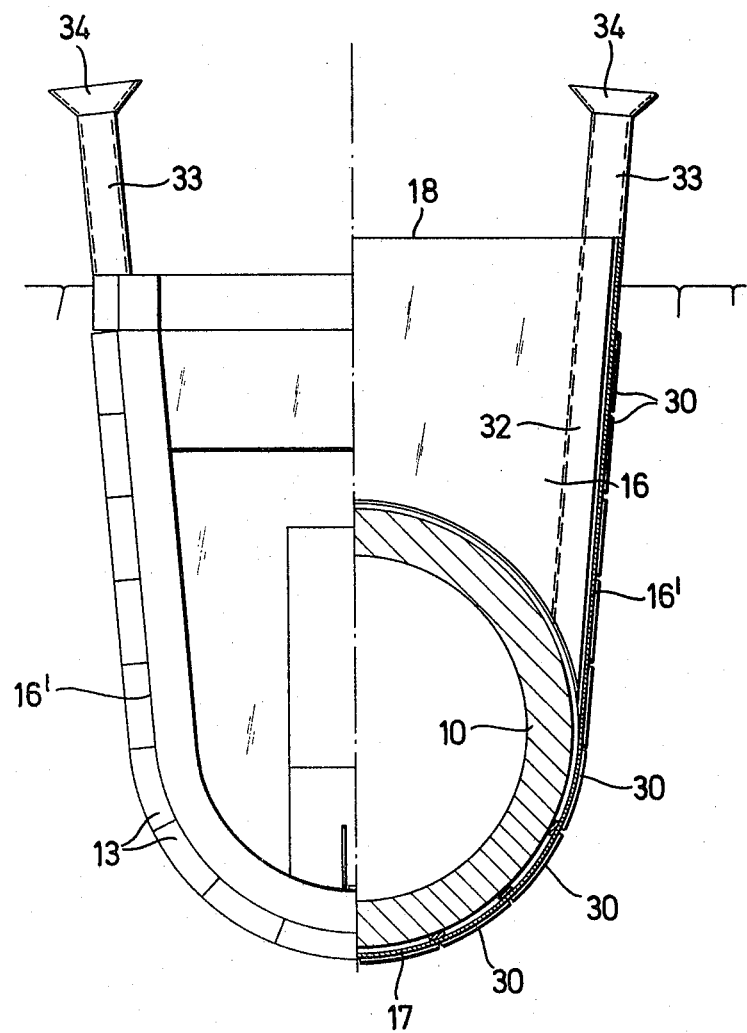
FIG. 2 is a part-sectional end view of the apparatus shown in FIG. 1.

Rearwardly of the members 13 and of the frame 15 relative to the working face of the trench and generally over the region of the trench supported by the members 30 there is provided a pipe receptacle 16 which serves to facilitate the installation of the pipe sections 10. This receptacle 16 takes the form of an open-topped box-like structure and is conveniently fabricated from sheet steel. As shown in FIG. 2, the receptacle has a U-shaped cross-section resembling a bath tub. The receptacle has side walls 16' which adjoin a curved bottom portion 17 and end walls which are described more fully hereinafter. The side walls 16' taper outwardly from one another in the upward sence to partly define an entry zone 18 for the pipe sections 10. The side walls 16' project slightly above the ground level. The bottom portion 17 of the receptacle 16 is of semicircular configuration with an internal radius of curvature approximating to the external radius of curvature of the pipe sections 10. The distance between the side walls 16' at the upper region of the receptacle, which partly defines the entry zone 18, is somewhat greater than the external diameter of the pipe sections 10. The entire receptacle 16 is in contact with and supported by the members 30.

As shown in FIG. 1, the receptacle 16 has an end wall 19 over the rear upper region facing the pipe line which adjoins a further curved wall 21 or neck which together with the bottom portion 17 forms a circular opening 20. This opening 20 has a diameter slightly greater than the external diameter of the pipe sections 10 and serves to receive the end region of the last previously-installed pipe section 10. The small radial gap between this end region of the endmost pipe section 10 of the pipe line and the opening 20 is sealed with a resilient packing 22 provided on the inner faces of the wall 21 and the bottom portion 17 and which engages on the end region of this pipe section 10.

A U-shaped tube 32, the purpose of which will be described hereinafter, has limbs 33 which extend generally parallel to the side walls 16' and a lower region which is formed around the outside of the wal 21 and which communicates with openings 35 in the wall 21.

The opposite front end wall of the receptacle 16, designated 23, is disposed adjacent the frame 15. This end wall 23 is shaped to provide a pocket or recess 24 and overlapping lugs or brackets are provided on the outside of the wall 23 at the lower part of the recess 24 and the frame 15. A pivot pin 29 extends through these lugs so that the entire receptacle 16 is connected for movement with the frame 15. Thus, when the frame 15 is moved up by the rams 14 the receptacle 16 follows.

A series of double-acting hydraulic piston and cylinder units 25 each has its cylinder pivotably connected as at 26 to a bracket or the like formed within the lower part of the recess 24 and on the inside of the wall 23. The pivot connections 26 permit the units 25 to be swivelled from an operative position represented by full lines in FIG. 1 into an inoperative position represented by chain-dotted lines in FIG. 1. The units 25 in their inoperative position can thus lie adjacent the inner face of the wall 23 within the recess 24 with the units extended (25") or retracted (25'). In the operative position each unit 25 can engage with a thrust pad 28 provided at the end of its piston rod 27 in a stepped groove at the end of the pipe section 10 placed into the receptacle 16. Preferably the connections 26 are easily detachable so that units 25 can be removed and replaced to cope with pipe sections 10 of different lengths. The units 25 when located with their thrust pads 28 engaged in the groove of the pipe section 10 are supplied with pressure fluid to extend and thereby urge the pipe section 10 in question towards the previously-installed pipe section 10 located by the opening 20 so that their stepped tongue and groove connections mate to join the sections together and complete the installation of that section 10. The operation of installing the sections 10 in this way is carried out as part of an overall sequence involving the shifting of the shield 12.

The units 25 can be used to assist the rams 14 in moving up the frame 15 and with it the receptacle 16. As the receptacle 16 is drawn up with the frame 15 the packing 22 slides over the last pipe-section 10 so as to locate on the outer end region of this section 10. When the frame 15 and the receptacle 16 have been moved up in this manner the receptacle 16 can receive the next section 10 which can be installed prior to advancement of the shield 12 again.

As the members 30 are drawn up to follow the members 13 during the advancement of the shield 12 a narrow gap formerly filled by the members 30 would be established between the endmost pipe section(s) 10 and the trench walls and floor. This would be disadvantageous since some subsidence would occur. To preclude this the gap denoted 36 is filled with some suitable liquid preferably a thixotropic pressure liquid, supplied via the tube 32. This tube 32 which communicates with the gap 36 via the openings 35 in the wall 21 has funnels 34 at each end of its limbs 33 permitting the liquid, designated 32, to be supplied to both limbs 33. The height of the libs 33 is such as to provide a sufficient pressure head to reliably fill the gap 36.

The apparatus is especially useful in water logged ground and it may be desirable to provide the receptacle 16 with a drain or sluice or with a manhole and cover.

I claim:

1. An apparatus for use in laying a pipe line composed of individual pipe sections arranged end-to-end; said apparatus comprising an advanceable shield for excavating an open trench and for supporting the walls thereof, said shield being composed of a plurality of longitudinally displaceable elongate members, frame means for supporting and guiding the members and ram means for effecting relative movement between the frame means and said members to effect advancement of the trench; and a receptacle located rearwardly of the shield relative to the direction of advancement, the receptacle having side walls, front and rear walls, relative to the direction of advancement, and an open top permitting a pipe section to be placed into the receptacle, the rear end wall of the receptacle being provided with an opening generally surrounding the pipe line, whereby the pipe section placed in the receptacle can be joined to a previously-installed pipe section extending through the opening which allows the receptacle to be shifted in the advancing direction and sealing means at the opening for engaging on the pipe section previously-installed to close off the interior of the receptacle in relation to its exterior and prevent the ingress of fluid material into the receptacle from the trench.

2. An apparatus according to claim 1, wherein the receptacle has a generaly U-shaped cross-section with side walls adjoining a bottom portion, the side walls tapering away from one another in the upward direction and the bottom portion being curvilinear with an internal radius of curvature approximating to that of the external diameter of the pipe sections.

3. Apparatus according to claim 2, wherein the rear end wall of the receptacle adjoins a further wall shaped to form a neck projecting along the pipe line, the further wall and the bottom portion defining said opening.

4. An apparatus according to claim 1, wherein the sealing means is a packing located on the inside of the said opening.

5. An apparatus according to claim 1, and further comprising piston and cylinder units located in the receptacle and serving to facilitate the joining of the pipe sections.

6. An apparatus according to claim 5, wherein each unit is pivotably connected to the receptacle and can be swivelled between an operative position and inoperative stowed position whereby in the operative position a unit can engage on the end of the pipe section received in the receptacle and can be extended to urge this pipe section against the previously-installed section to effect their joining.

7. An apparatus according to claim 6, wherein the front end of the receptacle has a recess for accommodating the units when in an inoperative position.

8. An apparatus according to claim 1, wherein the frame means and the receptacle are connected so that the receptacle moves with the frame means when the ram means are operated in unison to advance the frame means towards the working end face of the trench.

9. An apparatus according to claim 1, and further comprising supplementary elongate members for supporting the walls of the trench, said supplementary members being connected to the first-mentioned members with the receptacle being in contact with and supported by the supplementary members.

10. An apparatus according to claim 1, and further comprising means communicating with the interior of the opening exteriorly of the sealing means and serving to supply a pressure liquid for filling a gap produced between the interior of the trench and the pipe sections.

11. An apparatus according to claim 10, wherein said means takes the form of a V-shaped tube with limbs projecting upwardly from the receptacle and communicating with the interior of the opening at positions exteriorly of the sealing means.

12. A method of laying a pipe line composed of pipe sections arranged end-to-end; said method comprising operating ram means to advance parallel elongate cutting and supporting members in relation to frame means which supports and guides the members so as to excavate an open-topped trench, utilizing a receptacle located in the trench rearwardly of the frame means and members relative to the direction of advancement, the receptacle having side walls, front and rear end walls relative to the direction of advancement, an opening in the rear wall generally surrounding the pipe line and sealing means at the opening, introducing a pipe section into the receptacle, joining said pipe section in end-to-end relationship with a previously-installed pipe section at the end of thepipe line which extends through the opening in the rear end wall of the receptacle with the sealing means engaging thereon to close off the interior of the receptacle in relation to its exterior to prevent the ingress of fluid material into the receptacle from the trench and operating said ram means to shift the frame means and the receptacle in the advancing direction to cause the pipe section in the receptacle to extend through the opening with the sealing means engaging thereon.

13. A method according to claim 12, wherein the joining of pipe sections is effected by operating piston and cylinder units located in the receptacle and operable to urge the introduced pipe section towards the pipe line.

14. A method according to claim 12, and further comprising filling a gap produced between the interior of the trench and the pipe sections as the receptacle is shifted.

15. A method according to claim 12, and further comprising filling the part of the trench accommodating the rearward part of the pipe line to bury the pipe sections and re-constitute the ground level.

16. An apparatus for use in laying a pipe line composed of individual pipe sections arranged end-to-end; said apparatus comprising an advanceable shield for excavating an open trench and for supporting the walls thereof, said shield being composed of a plurality of longitudinally displaceable elongate members, frame means for supporting and guiding the members and ram means for effecting relative movement between the frame means and said members to effect advancement of the trench; a receptacle having an open top permitting a pipe section to be placed into the receptacle, the receptacle having an opening generally surrounding the pipe line whereby the pipe sections placed in the receptacle can be joined to a previously-installed pipe section extending through the opening which allows the receptacle to be shifted in the advancing direction; and piston and cylinder units located in the receptacle to facilitate the joining of the pipe sections, each unit being pivotably connected to the receptacle and capable of being swivelled between an operative position and an inoperative stowed position whereby in the operative position a unit can engage on the pipe section received in the receptacle and can be extended to urge this pipe section aginst the previously-installed section to effect their joining.

17. An apparatus for use in laying a pipe line composed of individual pipe sections arranged end-to-end; said apparatus comprising an advanceable shield for excavating an open trench and for supporting the walls thereof, said shield being composed of a plurality of longitudinally displaceable elongate members, frame means for supporting and guiding the members and ram means for effecting relative movement between the frame means and said members to effect advancement of the trench; a receptacle having an open top permitting a pipe section to be placed into the receptacle, the receptacle having an opening generally surrounding the pipe line whereby the pipe sections placed in the receptacle can be joined to a previously-installed pipe section extending through the opening which allows the receptacle to be shifted in the advancing direction and supplementary elongate members for supporting the walls of the trench, said supplementary members being connected to the first-mentioned members with the receptacle being in contact with and supported by the supplementary members.

18. An apparatus for use in laying a pipe line composed of individual pipe sections arranged end-to-end; said apparatus comprising an advanceable shield for excavating an open trench and for supporting the walls thereof, said shield being composed of a plurality of longitudinally displaceable elongate members, frame means for supporting and guiding the members and ram means for effecting relative movement between the frame means and said members to effect advancement of the trench; a receptacle located rearwardly of the shield relative to the direction of advancement, the receptacle having side walls, front and rear walls, relative to the direction of advancement, and an open top permitting a pipe section to be placed into the receptacle, the rear end wall of the receptacle being provided with an opening generally surrounding the pipe line, whereby the pipe section placed in the receptacle can be joined to a previously-installed pipe section extending through the opening which allows the receptacle to be shifted in the advancing direction and sealing means at the opening for engaging on the pipe section previously-installed to close off the interior of the receptacle in relation to its exterior and prevent the ingress of fluid material into the receptacle from the trench; and piston and cylinder units located in the receptacle to facilitate the joining of the pipe sections, each unit being pivotably connected to the receptacle and capable of being swivelled between an operative position and an inoperative stowed position whereby in the operative position a unit can engage on the pipe section received in the receptacle and can be extended to urge this pipe section against the previously-installed section to effect their joining.

* * * * *